Sept. 10, 1935.　　　　　F. SABINI　　　　　2,014,089
EGG BOILER
Filed Aug. 1, 1934　　　2 Sheets-Sheet 1
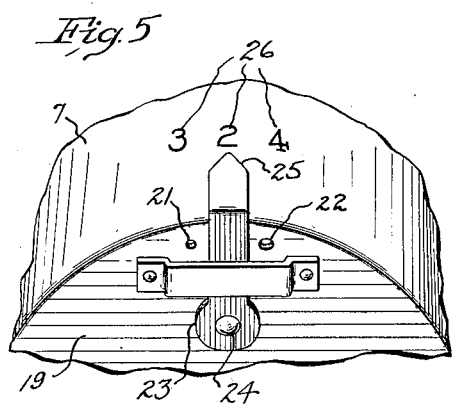
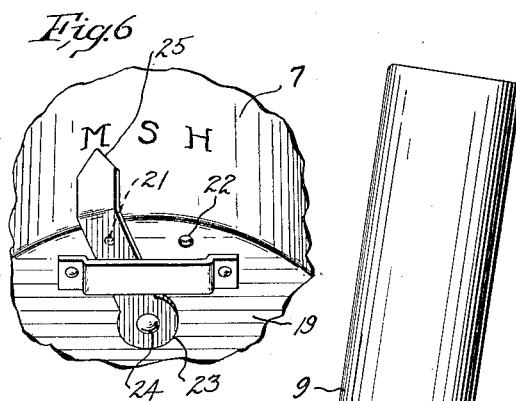
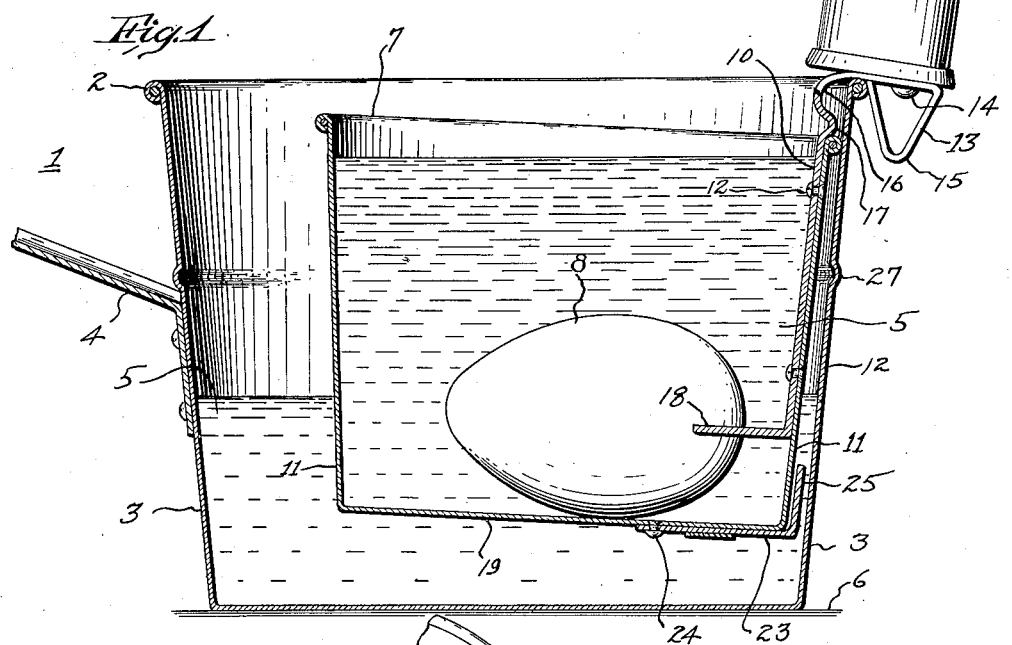
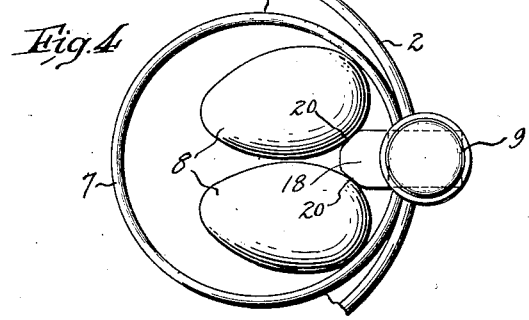
INVENTOR
Frederick Sabini,
BY
George D. Richards
ATTORNEY Sept. 10, 1935.  F. SABINI  2,014,089
EGG BOILER
Filed Aug. 1, 1934   2 Sheets-Sheet 2
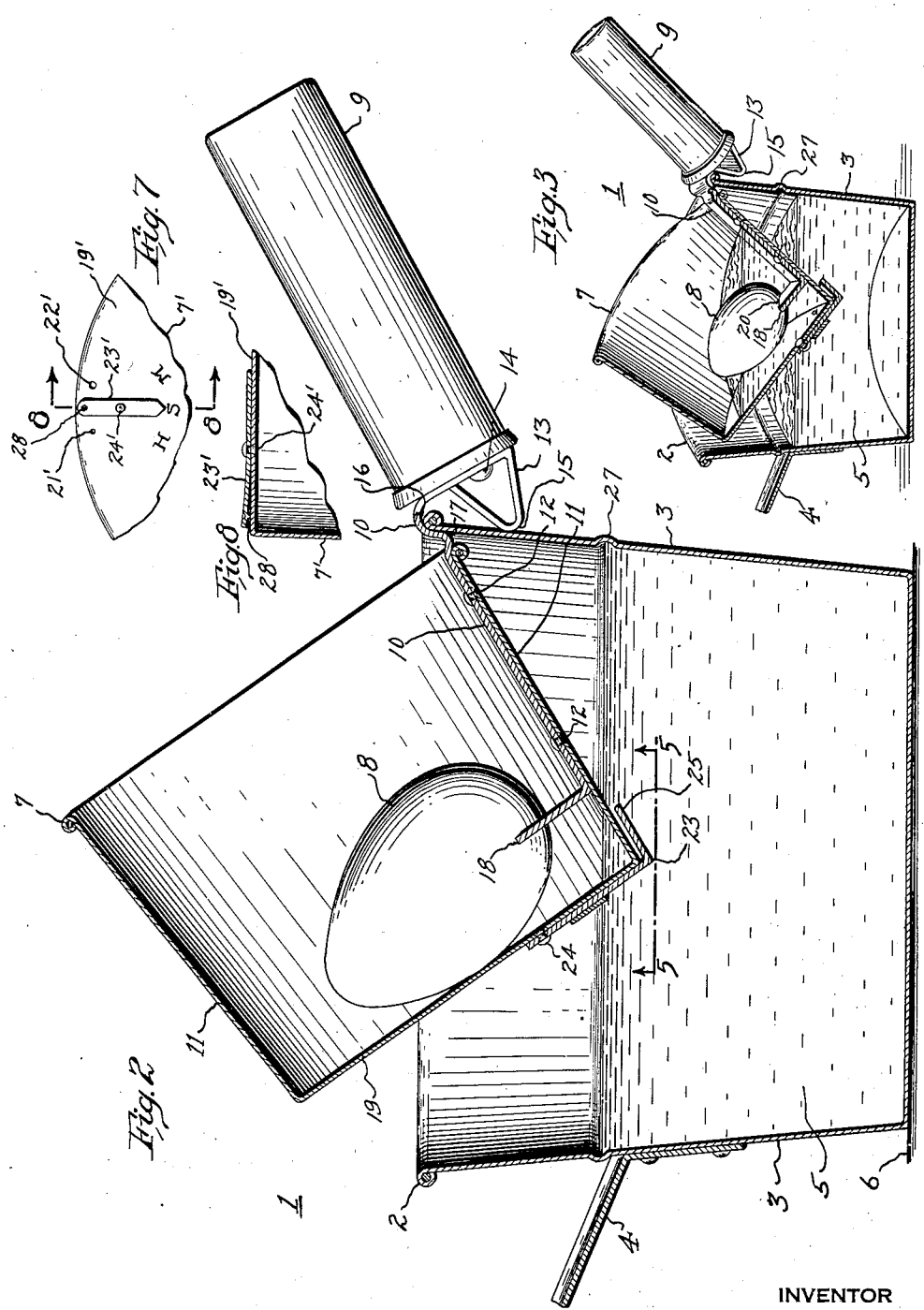
INVENTOR
Frederick Sabini,
BY
George D. Richards
ATTORNEY Patented Sept. 10, 1935

2,014,089

UNITED STATES PATENT OFFICE 2,014,089

EGG BOILER

Frederick Sabini, Arlington, N. J.

Application August 1, 1934, Serial No. 737,865

6 Claims. (Cl. 161—16)

This invention relates, generally, to the boiling of eggs and the invention has reference, more particularly, to a novel automatically operating egg-boiler.

Most everyone familiar with cooking knows the difficulty of uniformly obtaining the desired degree of hardness of boiled eggs and experience has shown that the only uniformly successful way to obtain medium or soft boiled eggs is to time the boiling period, but this requires close attention which cannot always be given.

The principal object of the present invention is to provide a novel egg boiler that serves to automatically time the boiling period of eggs, the said egg boiler being adapted to produce soft, medium or hard boiled eggs as desired.

Another object of the present invention lies in the provision of a novel egg boiler that allows the boiling water to escape from around the eggs at a predermined rate, so that when the egg or eggs within the boiler have reached the desired degree of hardness, the absence of boiling water will prevent further hardening of the eggs.

Still another object of the present invention is to provide a novel egg boiler of the above character that is of simple, rugged construction and is easily operated, the same being dependable and having a long life in use.

Other objects of this invention, not at this time more particularly enumerated, will be clearly understood from the following detailed description of the same.

The invention is clearly illustrated in the accompanying drawings, in which:

Fig. 1 is a vertical sectional view of the novel egg boiler of this invention in use, the parts of the same being illustrated in the positions assumed thereby at the beginning of the egg boiling operation.

Fig. 2 is a view similar to Fig. 1 but illustrates the egg boiler as positioned at the end of the egg boiling operation.

Fig. 3 is a perspective sectional view of the egg boiler illustrating a momentary position of the same during the boiling operation.

Fig. 4 is a reduced fragmentary plan view of the structure shown in Fig. 1.

Fig. 5 is a fragmentary perspective view of a detail of construction.

Fig. 6 is a view similar to Fig. 5 but illustrates the use of differing nomenclature.

Fig. 7 is a fragmentary view of a slightly modified detail of construction, and

Fig. 8 is a sectional view taken along line 8—8 of Fig. 7.

Similar characters of reference are employed in said views, to indicate corresponding parts.

Referring now to Figs. 1 to 5 of the said drawings, the reference 1 designates the novel egg boiler of this invention as a whole. Egg boiler 1 comprises a pan or container 2, preferably having substantially vertical side walls 3 and illustrated as having a handle 4, the said pan being adapted to receive water 5 to be boiled as by placing the pan 2 upon a suitable heating surface 6. The pan 2 is open at its top for receiving therewithin a second or inner pan 7 that is smaller than the outer pan 2, the inner pan 7 being adapted to receive the egg or eggs 8 in use.

Inner pan 7 has a weighted handle 9, illustrated as of substantially cylindrical shape, the same having cast iron, lead or other relatively heavy material therewithin to increase the weight thereof. Handle 9 has a connecting or shank portion 10 that is attached to the side wall 11 of pan 7 as by rivets 12. The shank portion 10 of the handle is illustrated as comprising a rigid metal strip that has its upper end portion bent into a substantially triangular loop 13, the upper part of the loop being secured to the weighted or main portion of the handle as by rivets 14. The lower free apex 15 of the loop 13 serves as an outer stop for aiding in limiting the outward turning movement of the pan 7 in use, as will further appear.

The shank 10 of handle 9 is curved at 16 to provide a concave bearing surface for enabling the ready turning of this shank upon the rolled upper edge of the outer pan 2 in use. Below the concave bearing surface 16 the shank 10 is reversely curved to provide an inner stop 17 which cooperates with the outer stop 15 as shown in Fig. 2 to limit the outward turning movement of the pan 7. The lower end portion 18 of shank 10 projects inwardly of pan 7 in a direction substantially parallel to the bottom 19 of this pan and has its side edges beveled at 20 (see Fig. 4). The end portion 18 serves to properly position the eggs within the pan 7 in use as shown in Fig. 4 and causes both eggs to be exposed to the hot water for the same period of time, as will further appear.

The bottom 19 of inner pan 7 is provided near its periphery and under the handle shank end portion 18 with two relatively small angularly spaced apertures 21 and 22 (see Fig. 5) the aperture 21 being somewhat smaller than the aperture 22. The sizes of apertures 21 and 22 are definite and are predetermined, their areas depending upon the size of pan 7 and upon the weight of handle 9. An index member 23 is pivotally connected to the bottom 19 of pan 7 as by a rivet 24, the said index member having a pointer 25 for pointing to any selected one of three numerals or indicia 26 marked on the side wall 11 of the pan 7. These numerals are 3, 2 and 4, and designate three minute, two minute and four minute eggs, respectively. When the pointer 25 is set opposite numeral 2, as shown in Fig. 5, both holes 21 and 22 are exposed. When the pointer 25 is set opposite numeral 3, the hole 21 is covered by the index member 23 and hole 22 is exposed. When the pointer 25 is set opposite numeral 4, the hole 22 is covered and the hole 21 is exposed.

In use, assuming that it is desired to obtain real soft or two minute eggs, the pointer 25 is set as shown in Fig. 5 and the egg or eggs to be boiled are placed in the inner pan 7, whereupon this pan is dipped into the outer pan 2 so that boiling water 5 enters the inner pan 7. Preferably, the outer pan 2 is provided with a circumferential corrugation 27 which serves to indicate how high the hot water level should be in this pan before dipping pan 7 thereinto. In dipping the pan 7 into pan 2 the former should preferably be inserted while in an upright position and then turned within pan 2 so that the side wall 11 opposite handle 9 touches the bottom of pan 2, whereupon the pan 7 is again turned to an upright position, the same having picked up a predetermined quantity of water by this dipping action. The pan 7 is then raised and the shank portion 10 of handle 9 placed upon the upper edge of pan 2 as shown in Fig. 1. The pan 7 will now rest in the position shown in Fig. 1, but owing to the presence of the apertures 21 and 22 and to the fact that handle 9, while in this position, more than counterbalances the weight of the main body of the pan 7, the handle 9 starts to turn very gradually in a clockwise direction about the upper edge of pan 2, the concave bearing surface 16 turning upon the upper rolled edge of pan 2.

The rate of movement of the pan 7 in turning about the edge of pan 2 is strictly limited by the areas of apertures 21 and 22 for if these apertures were not present, the counterbalancing weight of the main body of pan 7 together with that of the water and eggs therein, being greater than that of handle 9, would prevent the turning of the pan 7 any appreciable extent. Since apertures 21 and 22 are both open, the water within pan 7 passes gradually out through both of these apertures into pan 2, thereby permitting pan 7 to turn about the edge of pan 2 as shown in Fig. 3. After substantially two minutes have elapsed the water will have drained away from eggs 8, thereby producing two minute boiled eggs. The turning movement of the pan 7 is then brought to rest by the engagement of outer stop projection 15 with the outer wall of pan 2 and the engagement of inner stop projection 17 with the inner wall of pan 2 as especially shown in Fig. 2. If stops 15 and 17 were omitted the over-balancing effect of handle 9 would turn pan 7 completely out of pan 2, thereby discharging the eggs.

If it is desired to obtain three minute eggs, the index marker 23 is turned so that its pointer 25 is positioned opposite the number "3" on the pan 7, in which position the index member 23 closes aperture 21. Thus, the turning movement of pan 7 is limited by the area of the larger aperture 22 and a longer time is required to drain the water away from the eggs. If it is desired to obtain four minute eggs, the index member 23 is turned so that its pointer 25 is opposite number "4", in which position the index member closes the larger aperture 22 so that the water flowing out of the smaller aperture 21 takes a longer time, i. e. four minutes to uncover the eggs. The handle projection 18 causes both of the eggs, i. e. when two eggs are used, to lie on opposite sides of this projection so that both eggs are equally submerged and hence are both boiled the desired length of time.

Instead of using the numerals 3, 2 and 4 in the pan 7, the letters M, S and H may be used if desired, meaning medium, soft and hard boiled, as shown in Fig. 6. Also, instead of using the form of index member shown in Figs. 1 to 6, the somewhat simpler form shown in Figs. 7 and 8 may be used. In these figures, the bottom 19' of pan 7' has the index member 23' pivoted thereon as by a rivet 24'. One end of the index member has an outstruck boss 28 for snapping into either of the apertures 21' or 22' while the pointer 25' on the other end of the index member is adapted to register with any one of the letters H, S, or M. The operation of this form of the invention, is exactly the same as that previously described.

Although eggs of three degrees of hardness are produced by the device illustrated in the drawings, additional degrees of hardness may be obtained, if desired, by using additional apertures similar to apertures 21 and 22. Also, the boiler 30 may be made in larger sizes to hold a greater number of eggs, if desired.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. In an egg boiler of the character described, an outer pan, and an egg and hot water receiving inner pan having a handle shank arranged to be supported upon the peripheral edge of said outer pan, said inner pan having a handle over-balancing the weight of the container portion of said inner pan for turning said inner pan outwardly of said outer pan and having an apertured lower portion to enable the escape of water therefrom and from around the eggs within said inner pan, the rate at which the water escapes from said inner pan serving to determine the rate of outward turning movement of said inner pan and the degree of hardness obtained by said eggs.

2. In an egg boiler of the character described, an outer pan, and an egg and hot water receiving inner pan having a handle shank arranged to be supported upon the upper edge of said outer pan, said inner pan having a handle over-balancing the weight of the container portion of said inner pan for turning said inner pan outwardly of said outer pan and having an apertured lower portion to enable the escape of water therefrom and from around the eggs within said inner pan, a member carried by said inner pan, said member serving to vary the aperture area of said inner pan, to thereby determine the rate at which the water escapes from the latter and hence the rate of outward turning movement of said inner pan.

3. In an egg boiler of the character described, an outer pan adapted to hold water, an egg receiving inner pan arranged to be dipped into said outer pan to scoop up water therefrom, said inner pan having a weighted handle having its shank portion arranged to be turnably supported upon the upper peripheral edge of said outer pan, the lower portion of said inner pan being apertured to enable the water to slowly escape therefrom and from around the eggs therein while said inner pan turns outwardly of said outer pan under the over-balancing action of said handle, the aperture area of said inner pan serving to determine the rate of escape of water therefrom and hence determining the period of immersion of the eggs in the water within said inner pan.

4. In an egg boiler of the character described, an outer pan adapted to hold hot water, an egg receiving inner pan arranged to be dipped into said outer pan to scoop up hot water therefrom, said inner pan having a weighted handle having a shank portion provided with a concave bearing surface for engaging the upper edge of said outer pan whereby said inner pan is turnably supported upon the upper edge of said outer pan, the lower portion of said inner pan being apertured to enable the water to slowly escape therefrom and from around the eggs therein while said inner pan turns outwardly of said outer pan under the over-balancing action of said handle, means for varying at will the aperture area of said inner pan, whereby the rate of escape of water from said inner pan is regulated, and stop means provided on said handle for limiting the outward turning movement of said inner pan.

5. In an egg boiler of the character described, an outer pan adapted to hold hot water, an egg receiving inner pan arranged to be dipped into said outer pan to scoop up hot water therefrom, said inner pan having a weighted handle provided with a shank portion shaped so as to be turnably supported upon the upper edge of said outer pan, the lower portion of said inner pan being apertured to enable the water to slowly escape therefrom and from around the eggs therein while said inner pan turns outwardly of said outer pan under the over-balancing action of said handle, an indexing member pivotally mounted on said inner pan and cooperating indicia provided on said inner pan, the manual turning of said indexing member from one indicium to another serving to vary the aperture area of said inner pan, thereby varying the rate of escape of water from said inner pan and hence the period of immersion of the eggs within said inner pan.

6. In an egg boiler of the character described, an outer pan adapted to hold hot water, an egg receiving inner pan arranged to be dipped into said outer pan to scoop up water therefrom, said inner pan having a weighted handle provided with a shank portion having a concave bearing surface turnably supported upon the upper edge of said outer pan, the bottom of said inner pan having apertures of differing sizes therein to allow the escape of water from said inner pan and from around the eggs therein while said inner pan turns outwardly of said outer pan under the over-balancing action of said weighted handle, an indexing member adjustably mounted on said inner pan for selectively closing said apertures to thereby vary the rate of escape of water from said inner pan and hence the period of immersion of the eggs within said inner pan.

FREDERICK SABINI.